(No Model.)

P. J. PAULY, Jr.
SHELF ROLLER.

No. 537,066. Patented Apr. 9, 1895.

Witnesses

Inventor
Peter J. Pauly Jr.
By his Attorneys

UNITED STATES PATENT OFFICE.

PETER J. PAULY, JR., OF ST. LOUIS, MISSOURI.

SHELF-ROLLER.

SPECIFICATION forming part of Letters Patent No. 537,066, dated April 9, 1895.

Application filed December 19, 1894. Serial No. 532,333. (No model.)

*To all whom it may concern:*

Be it known that I, PETER J. PAULY, Jr., a citizen of the United States, residing at St. Louis, in the State of Missouri, have invented certain new and useful Improvements in Shelf-Rollers, of which the following is a full, clear, and exact description, reference being had to the accompanying drawings, forming a part hereof.

My invention has relation to improvements in rollers for book shelves and consists in the novel arrangement and combination of parts more fully set forth in the specification and pointed out in the claims.

Figure 1:
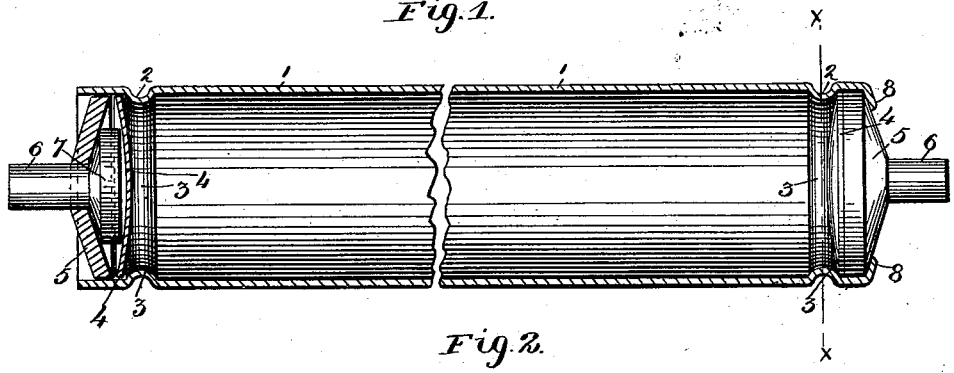
Figure 2:
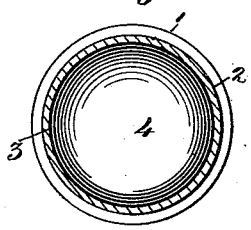
Figure 3:
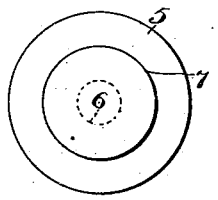
Figure 4:
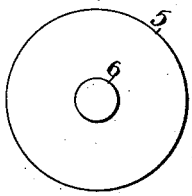
Figure 5:
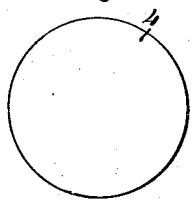

In the drawings, Figure 1 is a middle vertical longitudinal section of the roller tube and bearing at one end, the opposite bearing being shown in side elevation. Fig. 2 is a vertical transverse section taken on the line $x$—$x$ of Fig. 1. Fig. 3 is a rear view of the bearing-supporting washer. Fig. 4 is a front view of the same, and Fig. 5 is a plan view of the disk located behind the washer.

The object of my present invention is to construct a roller which will combine simplicity of construction with durability, the roller being made up of a minimum number of parts consistent with maximum stiffness, said stiffness being most pronounced at the bearings, where of course, the roller is subjected to the greatest amount of wear.

To this end I have devised a roller which in detail may be described as follows:

Referring to the drawings, 1 represents a hollow tube or cylinder preferably of sheet metal, which, at a certain distance from its free ends has formed thereon the annular depressions or grooves 2, said grooves forming by their construction annular shoulders 3 on the interior of the tube or cylinder, against which shoulders are adapted to rest the circular inwardly-concave disks 4. When the disks 4 are once in their proper position within the tube, there are then inserted into the open ends of the cylinder the outwardly-convex washers 5 which have a central opening for the snug and tight reception of the cylindrical bearings 6 of the roller, said bearings each carrying a head 7 formed integrally with its bearing. It is obvious of course that the washer 5 and the disk 4 are respectively convexed outwardly and concaved inwardly for the reception of the head 7; for the additional reason that a comparatively compact form of bearing is thus formed; and for a further reason that the washer being outwardly convexed the liability of friction of the ends of the roller against the lateral walls which support the bearings is reduced to a minimum. After the washer 5 is in place, the free edges of the open ends of the tube are folded over the parts, thus forming a terminal flange 8 which keeps the parts permanently in place. If deemed desirable the tube or cylinder may be provided with an inner core of wood or similar material to increase the stiffness of the tube, especially where the tube is of unusual length; but it will be found in practice that the tube without such core is amply stiff to withstand the pressure to which it is subjected.

Having described my invention, what I claim is—

1. In a shelf roller, a suitable hollow tube or cylinder, an annular groove or depression formed near the free ends thereof, a disk located at either end within the tube exteriorly to the shoulder formed by the said depression, and suitable bearings exterior to said disks, substantially as set forth.

2. In a shelf roller, a suitable hollow tube or cylinder, an annular groove or depression formed near the free ends thereof, an inwardly concave disk located at either end within the tube but exteriorly to the shoulder formed by the depression, and suitable bearings exterior to said disks, substantially as set forth.

3. In a shelf roller, a suitable hollow tube or cylinder, an annular groove or depression formed near the free ends thereof, an inwardly-concave disk located at either end within the tube and exteriorly to the shoulder formed by the said depression, a washer adjacent to each disk within the tube, and a bearing secured to each washer, substantially as set forth.

4. A shelf roller comprising a suitable hollow tube or cylinder, annular grooves formed near its free ends, an inwardly-concave disk resting against the shoulder formed by each groove, an outwardly-convex washer adjacent to each disk, a terminal flange folded over the edges of said washer, a bearing passed through and carried by the washer, and a head at the inner end of the bearing confined between the washer and disk, substantially as set forth.

5. In a shelf roller, a suitable hollow tube or cylinder, an annular depression or groove formed on the tube at either end thereof forming thereby corresponding inner annular shoulders, an outwardly convexed washer at either end located exterior to each shoulder, a bearing for said washer, and a terminal flange on said cylinder folded over the outer edges of said washer, substantially as set forth.

In testimony whereof I affix my signature in presence of two witnesses.

PETER J. PAULY, Jr.

Witnesses:
H. A. UHL,
E. STAREK.